(12) United States Patent
Capek et al.

(10) Patent No.: US 9,556,064 B2
(45) Date of Patent: Jan. 31, 2017

(54) METHOD OF MAKING A COVER GLASS

(71) Applicant: CORNING INCORPORATED, Corning, NY (US)

(72) Inventors: Thomas George Capek, Elmira, NY (US); Gregory Scott Glaesemann, Corning, NY (US); Jeffrey Todd Kohli, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/399,636

(22) PCT Filed: May 8, 2013

(86) PCT No.: PCT/US2013/040024
§ 371 (c)(1),
(2) Date: Nov. 7, 2014

(87) PCT Pub. No.: WO2013/169830
PCT Pub. Date: Nov. 14, 2013

(65) Prior Publication Data
US 2015/0114041 A1    Apr. 30, 2015

Related U.S. Application Data

(60) Provisional application No. 61/644,598, filed on May 9, 2012.

(51) Int. Cl.
*C03C 17/28* (2006.01)
*C03B 17/06* (2006.01)
*C03C 21/00* (2006.01)

(52) U.S. Cl.
CPC ............. *C03C 17/28* (2013.01); *C03C 21/002* (2013.01); *C03B 17/064* (2013.01);
(Continued)

(58) Field of Classification Search
CPC ........ C03C 17/00; C03C 17/28; C03C 21/002; C03C 2218/111; C03C 2218/112; C03C 2218/33; C03B 23/02; C03B 33/0222; C03B 33/033; C03B 33/091; C03B 11/06; C03B 11/088; C03B 11/12; C03B 11/16; C03B 2205/30; C03B 2215/44; C03B 37/01; C03B 37/014; C03B 37/016; C03B 37/027
See application file for complete search history.

(56) References Cited

U.S. PATENT DOCUMENTS 3,357,876 A    12/1967   Rinehart
3,409,423 A    11/1968   De LaJarte
(Continued)

FOREIGN PATENT DOCUMENTS

WO    2007108905    9/2007    ............ C09J 175/04
WO    2010010159    1/2010    ............ C09D 5/00

OTHER PUBLICATIONS

Oalgliersh et al; "The Strength and Testing of Window Glass," Canadian Journal of Civil Engineering, vol. 17, No. 5, Oct. 1990, p. 753).

(Continued)

*Primary Examiner* — Jodi C Franklin
(74) *Attorney, Agent, or Firm* — John T. Haran; Jie Gao

(57) ABSTRACT

A method of making a strengthened glass article includes providing a flat glass article having a select contour and a glass surface covered by a protective coating layer. The protective coating layer is removed from the glass surface without touching the glass surface with any solid object. Immediately after the protective coating layer is removed from the glass surface, the flat glass article is subjected to an (Continued)

ion-exchange process to strengthen the flat glass article and improve the resistance of the flat glass article to subsequent damage.

19 Claims, 8 Drawing Sheets

(52) U.S. Cl.
CPC ... *C03C 2218/111* (2013.01); *C03C 2218/112* (2013.01); *C03C 2218/33* (2013.01); *C03C 2218/355* (2013.01)

(56) References Cited

U.S. PATENT DOCUMENTS

| | | | |
|---|---|---|---|
| 3,420,693 A | 1/1969 | Scholes et al. | 117/72 |
| 4,483,700 A | 11/1984 | Forker, Jr. et al. | |
| 5,674,790 A | 10/1997 | Araujo | |
| 6,233,972 B1 | 5/2001 | Foster et al. | 65/60.3 |
| 6,379,746 B1 | 4/2002 | Birch et al. | 427/154 |
| 6,491,972 B1 | 12/2002 | Weber et al. | 427/154 |
| 6,689,414 B2 | 2/2004 | Weber et al. | 427/154 |
| 6,715,316 B2 | 4/2004 | He et al. | 65/23 |
| 7,514,149 B2 | 4/2009 | Bocko et al. | |
| 7,666,511 B2 | 2/2010 | Ellison et al. | |
| 8,080,299 B2 | 12/2011 | Baikerikar et al. | 428/38 |
| 8,586,492 B2 | 11/2013 | Barefoot et al. | |
| 8,802,581 B2 | 8/2014 | Dejneka et al. | |
| 8,969,226 B2 | 3/2015 | Dejneka et al. | |
| 9,290,413 B2 | 3/2016 | Dejneka et al. | |
| 9,346,703 B2 | 5/2016 | Bookbinder et al. | |
| 2003/0186065 A1 | 10/2003 | Hou et al. | 428/441 |
| 2004/0043142 A1 | 3/2004 | Birch et al. | 427/164 |
| 2005/0053768 A1 | 3/2005 | Friedman et al. | 428/167 |
| 2005/0158565 A1 | 7/2005 | Allaire et al. | 428/426 |
| 2005/0210921 A1 | 9/2005 | Richardson et al. | 65/23 |
| 2009/0258187 A1 | 10/2009 | Brady et al. | |
| 2010/0297392 A1 | 11/2010 | Chen et al. | 428/141 |
| 2010/0316828 A1 | 12/2010 | Baikerikar et al. | 428/38 |
| 2011/0177324 A1 | 7/2011 | Zagdoun et al. | 428/327 |
| 2012/0052302 A1 | 3/2012 | Matusick et al. | |
| 2012/0135177 A1* | 5/2012 | Cornejo | B26F 3/002 428/43 |

OTHER PUBLICATIONS

TW102116263 Search Report Dated September 21, 2016; 1 Page; Taiwan Patent Office.

* cited by examiner

METHOD OF MAKING A COVER GLASS

This application claims the benefit of priority under 35 U.S.C. §119 of U.S. Provisional Application Ser. No. 61/644,598 filed on May 9, 2012 the content of which is relied upon and incorporated herein by reference in its entirety.

TECHNICAL FIELD

This disclosure relates generally to a method of strengthening glass and to a strengthened glass article that is tough and resistant to damage and usable as a cover glass of a mobile electronic device.

BACKGROUND ART

Glass because of its natural beauty, sleekness, and transparency is desirable for use as cover glass for displays in mobile (or portable) electronic devices. However, mobile electronic devices because of their mobile nature, and often small size, are prone to accidents that can cause glass to become scratched, chipped, or broken. For cover glasses to find wide use in mobile electronic devices, they would need to be tough and resistant to damage.

"Glass under load deforms elastically until sudden failure is initiated at a surface flaw under high stress" (W. A. Dalgliesh and D. A. Taylor, "The Strength and Testing of Window Glass," Canadian Journal of Civil Engineering, Vol. 17, No. 5, October 1990, p. 753). To increase the threshold for sudden failure, glass is often subjected to a thermal or chemical strengthening process. These strengthening processes place the glass surface in compression, thereby increasing the amount of load that can be applied to the glass before the glass fails.

Prior to strengthening, the glass is particularly susceptible to damage, which may occur when a solid (or hard) object touches the glass. The damage to the glass may include surface flaws such as scratches and nicks, which would become failure sites under high stress. The surface flaws in the glass typically persist after the glass has been subjected to the strengthening process. Tiny surface flaws, e.g., with sizes less than 5 µm, have been found to adversely impact the performance of a strengthened glass as measured by a ball drop test.

SUMMARY OF INVENTION

This disclosure describes strengthening of glass articles. The strengthened glass articles can be used as cover glass in mobile electronic devices, although the strengthened glass articles need not be limited to such use. The invention described in this disclosure provides a method of making strengthened glass articles with minimal to no surface flaws, thereby increasing the performance of the strengthened glass articles.

In one illustrative embodiment of the invention, a method of making a strengthened glass article comprises providing a flat glass article having a select contour and a glass surface covered by a protective coating layer. The method includes removing the protective coating layer from the glass surface without touching the glass surface with any solid object. Immediately after the protective coating layer is removed from the glass surface, the flat glass article is subjected to an ion-exchange process to strengthen the flat glass article and improve the resistance of the flat glass article to subsequent damage.

In another illustrative embodiment of the invention, a method of making a strengthened glass article comprises supplying molten glass to a weir such that the molten glass overflows the weir and forms a glass ribbon, which is then drawn through a thermally-graded channel. While drawing the glass ribbon through the thermally-graded channel, at least one protective coating material is deposited on a surface area of the glass ribbon to form a protective coating layer on the surface area of the glass ribbon. A glass sheet is separated from a section of the glass ribbon covered by the protective coating layer. The method includes preparing a flat glass article having a select contour and a glass surface covered by the protective coating layer from the glass sheet. The method further includes removing the protective coating layer from the glass surface without touching the glass surface with any solid object. Immediately after removing the protective coating layer from the glass surface, the flat glass article is subjected to an ion-exchange process to strengthen the flat glass article and improve the resistance of the flat glass article to subsequent damage.

The illustrative embodiments described above are intended to provide an introduction to the invention. They are not intended to identify key or critical elements of the invention or to delineate the scope of the invention. Various embodiments of the invention will be described in greater detail below with reference to the accompanying drawings.

BRIEF DESCRIPTION OF DRAWINGS

The following is a description of the figures in the accompanying drawings. The figures are not necessarily to scale, and certain features and certain views of the figures may be shown exaggerated in scale or in schematic in the interest of clarity and conciseness.

DESCRIPTION OF EMBODIMENTS

Figure 1A:
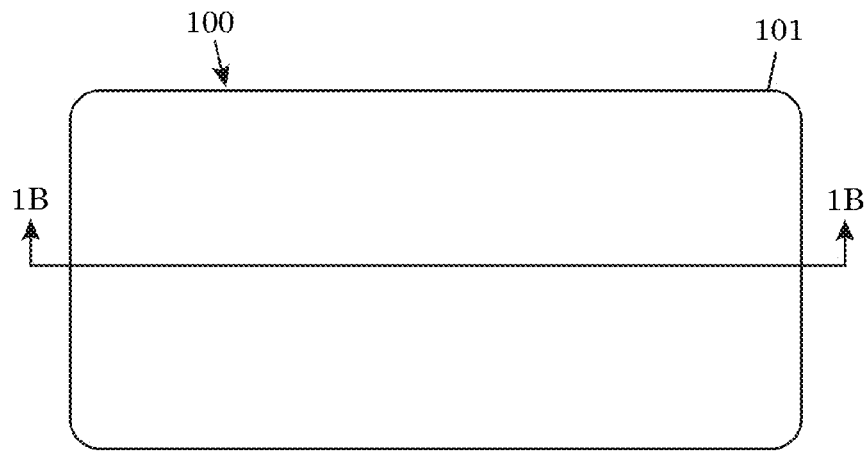
FIG. 1A shows a flat glass article.

In the following description, numerous specific details may be set forth in order to provide a thorough understanding of various embodiments of the invention. However, it will be clear to one skilled in the art when the invention may be practiced without some or all of these specific details. In other instances, well-known features or processes may not be described in detail. In addition, like or identical reference numerals may be used to identify common or similar elements.

A method of making a strengthened glass article, such as a cover glass for a mobile electronic device, involves providing a flat glass article, such as shown at 100 in FIG. 1A. The flat glass article 100 has a contour 101. For a cover glass application, the contour 101 would be dictated by the requirements of the mobile electronic device in which the cover glass will be used. Examples of contours include, but are not limited to, rectangular and rounded-rectangular contour. For other applications, the contour 101 will be dictated by the requirements of those applications.

Figure 1B:
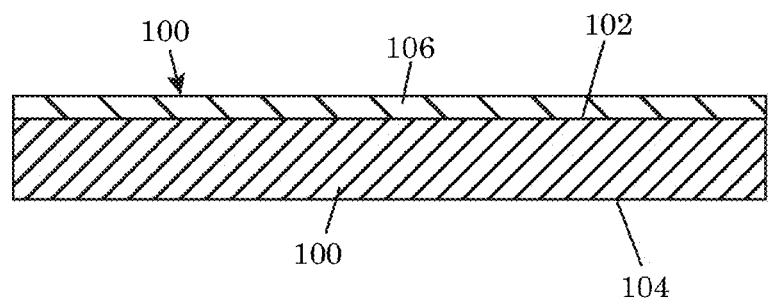
FIG. 1B is a cross-section of the flat glass article of FIG. 1A along line 1B-1B.

In FIG. 1B, the flat glass article 100 has a glass surface 102 covered by a protective coating layer 106. Although not illustrated, the other surface 104 of the flat glass article 100 may also be covered by a protective coating layer. For most glass thicknesses, the protective coating layer 106 may have a thickness in a range from 1 to 14 microns. Typically, the glass thicknesses will be less than 1.5 mm. The protective coating layer 106 may have a single hardness or sublayers with different hardnesses. In a preferred embodiment, the glass surface 102 covered by the protective coating layer 106 is a virgin glass surface. The term "virgin glass surface" means that the glass surface has not been touched by any solid (or hard) object that can form flaws in the glass surface since the glass surface was made from molten glass. Therefore, the virgin glass surface is pristine prior to being covered by the protective coating layer 106 and while being covered by the protective coating layer 106. The glass surface 104 may also be a virgin glass surface and may be covered by a protective coating layer as already mentioned above.

The method includes removing the protective coating layer 106 from the glass surface 102 without touching the glass surface 102 with any solid (or hard) object. If the other surface 104 of the flat glass article 100 is covered by a protective coating layer, this protective coating layer will also be removed. Immediately after removing the protective coating layer 106 from the glass surface 102, the flat glass article 100 without the protective coating layer covering the glass surface 102 is chemically strengthened by an ion-exchange process. The resulting ion-exchanged glass becomes the cover glass. After strengthening, the cover glass may be covered by other surface coatings, such as an anti-smudge coating. Where the glass surface 102 is a virgin glass surface, the protective coating layer 106 prevents formation of flaws in the glass surface 102 between the moment the glass surface is made from molten glass and the moment the glass surface is subjected to the ion-exchange process. This results in a strengthened cover glass that is substantially free of surface flaws and resistant to damage.

Figure 1C:
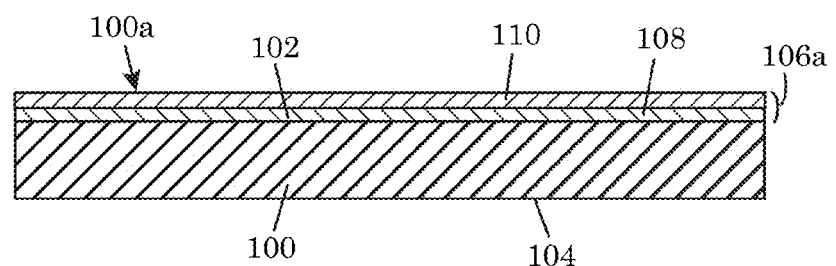
FIG. 1C shows a flat glass article having a glass surface covered by a protective coating having sublayers with different hardnesses.

In FIG. 1B, the protective coating 106 is shown as being homogeneous with a single hardness. FIG. 1C shows a flat glass article 100a with a protective coating layer 106a having two sublayers 108, 110 with different hardnesses. The inner sublayer 108 is in contact with the glass surface 102 and the outer sublayer 110 is in contact with the inner sublayer 108, with the outer sublayer 110 having a greater hardness than the inner sublayer 108. The lower hardness of the inner sublayer 108 provides a cushioning effect at the glass surface 102, and the higher hardness of the outer sublayer 110 provides a more durable layer on the exterior of the protective coating layer 106a that resists penetration from hard or sharp objects. The protective coating layer 106a may have more than two sublayers, with the general rule that the sublayer closest to the glass surface 102 will have the smallest hardness and the sublayer farthest from the glass surface 102 will have the highest hardness.

In one embodiment, the protective coating material of the inner sublayer 108 is the same as the protective coating material of the outer sublayer 110, and differential curing (i.e., curing under different conditions) is used to achieve the different hardnesses of the inner and outer sublayers 108, 110. One practical method of forming the protective coating layer 106a is to deposit a first thickness of protective coating material corresponding to the inner sublayer 108 on the glass surface and cure this first thickness of protective coating material under one set of conditions. Then, a second thickness of protective coating material corresponding to the outer sublayer 110 can be deposited on the first thickness of protective coating material and cured under another set of conditions. It may also be possible to deposit the entire thickness of protective coating layer 106a on the glass surface and then apply a first curing that affects an inner region of the protective coating layer and a second curing that affects an outer region of the protective coating layer.

In another embodiment, the protective coating materials of the inner and outer sublayers 108, 110 are different and are selected such that the inner and outer sublayers 108, 110 have different hardnesses after curing.

In general, the protective coating 106, 106a may be an organic coating or a hybrid organic/inorganic coating. In one embodiment, the protective coating 106, 106a is a polymer coating. In one specific embodiment, the protective coating 106, 106a is an acrylic coating. One example of a suitable acrylic coating is available under code MP-4983R-PL from Michelman, Inc. (Cincinnati Ohio). Cured or dried MP-4983R-PL acrylic coating is soluble in ammonia or high-pH medium. The MP-4983R-PL acrylic coating provides a thin, micron-range, semi-transparent coating that will resist dirt, wear, and other elements. The acrylic coating dries at room temperature to form a clear film. Other types of acrylic coatings may be used.

Preferably, the protecting coating material (or materials) used in forming the protective coating layer 106, 106a can be provided in liquid or gel form that can be applied to the glass surface without physically touching the glass surface. Preferably, the protective coating layer 106, 106a can be relatively easily removed from the glass surface using a non-mechanical means, such as immersion in a mild acid or basic solution, without damaging the glass surface. For example, the acrylic coating mentioned above can be removed from glass using 0.1N KOH solution (pH=12) in a hot bath (e.g., at approximately 400° C.). Preferably, the protective coating 106, 106a is durable at temperature and humidity conditions in which the flat glass article 100, 100a may be stored or worked on. In one embodiment, the protective coating 106, 106a may be durable at temperatures up to 200° C. and at relative humidity up to 85%.

In one embodiment, a method of providing the flat glass article 100, 100a involves forming a glass ribbon from molten glass. The glass ribbon is preferably formed via a fusion down-draw process, although the glass ribbon may also be formed by a float process or another process that allows a glass surface to be made from molten glass without touching the glass surface with a solid (or hard) object. Basic description of the fusion down-draw process can be found in the patent literature, e.g., U.S. Pat. No. 3,338,696 (published 29 Aug. 1967; Dockerty) and U.S. Pat. No. 3,682,609 (published 8 Aug. 1972; Dockerty).

Figure 2A:
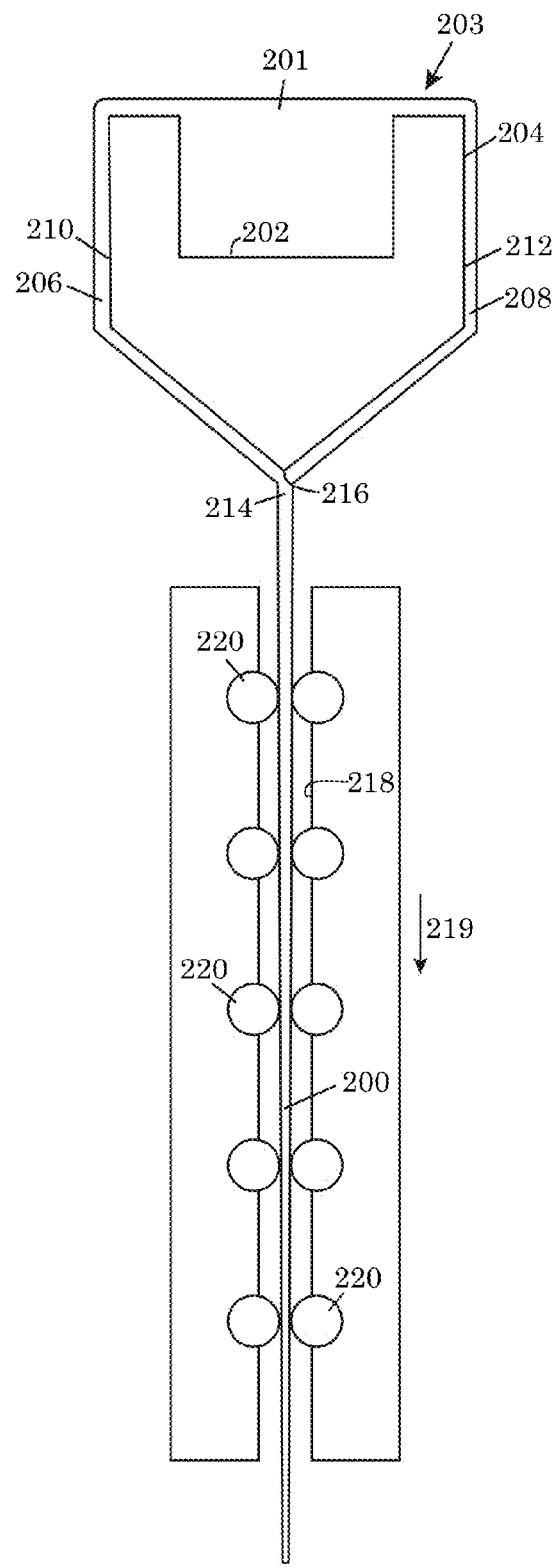
FIG. 2A shows a side view of a fusion draw system.

FIG. 2A shows a glass ribbon 200 being produced by a fusion down-draw process on a fusion draw system 203. Only the portions of the fusion draw system 203 relevant for discussion are shown. Molten glass 201 is delivered to a weir 202 of a fusion isopipe 204. The delivery is continuous such that the molten glass 201 overflows the top of the weir 202. The overflowing molten glass 201 divides into two separate streams 206, 208 that flows down opposite converging sidewalls 210, 212 of the fusion isopipe 204. The divided streams 206, 208 merge into a single stream 214 at the root 216 of the fusion isopipe 204. This single stream is drawn down a thermally-graded channel 218 (i.e., a channel having different thermal zones, with temperature decreasing in the direction shown by the arrow 219) to form the glass ribbon 200. Edge-guide devices 220, such as rollers, at the edges of the channel 218 guide the travel of the glass ribbon 200 through the channel 218.

In the fusion down-draw process, the inner surfaces of the divided streams 206, 208 that contacted the sidewalls 210, 212 of the fusion isopipe 204 end up in the interior of the glass ribbon 200, while the outer surfaces of the divided streams 206, 208 that did not contact the sidewalls 210, 212 of the fusion isopipe 204 end up on the exterior of the glass ribbon 200. These exterior glass surfaces become the front and back surfaces of the glass ribbon 200 and contain the usable areas of the glass ribbon 200 that are pristine and of fire-polished quality.

Figure 2B:
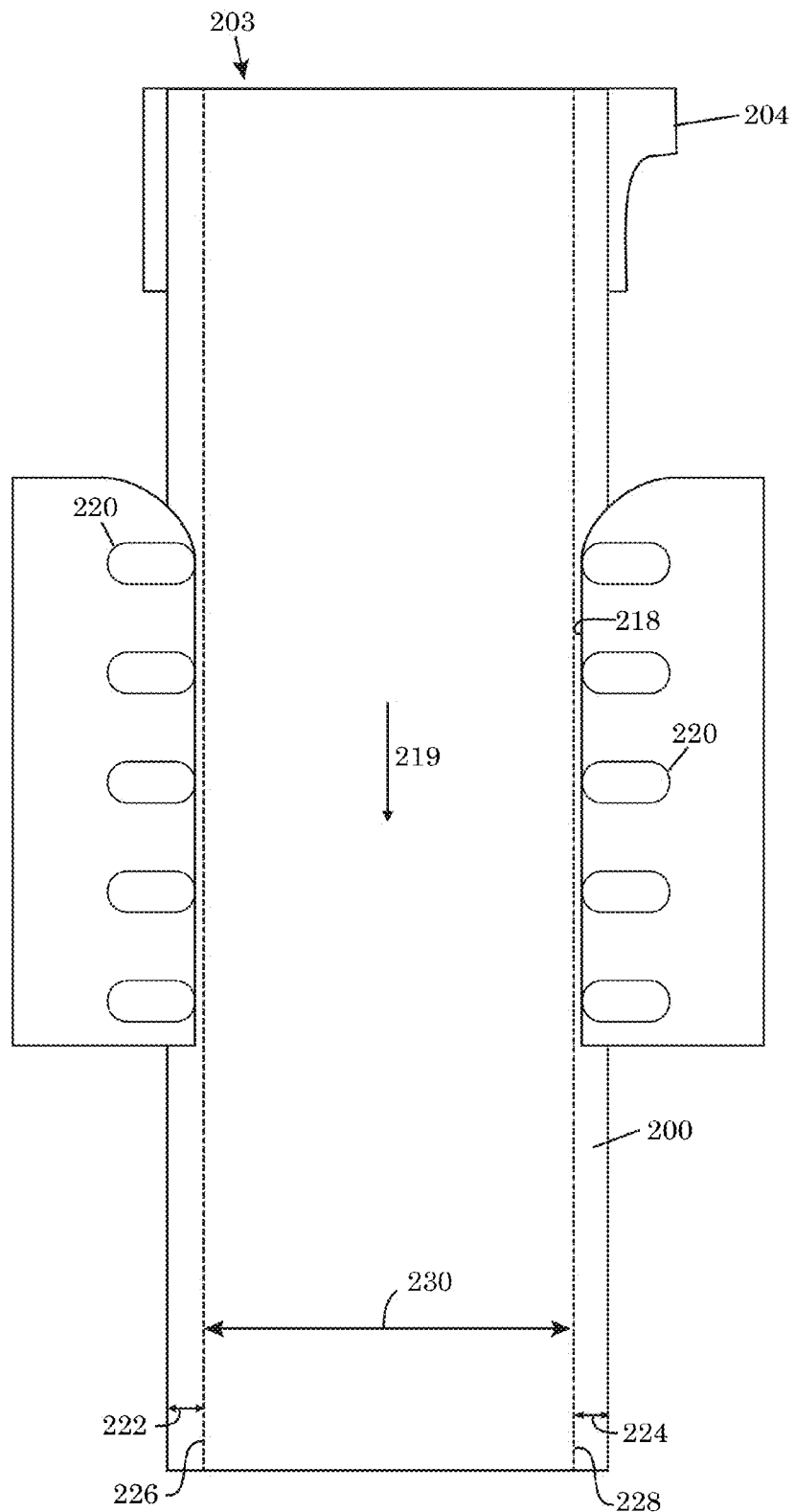
FIG. 2B shows a front view of a fusion draw system.

To illustrate what is meant by usable area, a surface of the glass ribbon 200 is shown in FIG. 2B. The glass ribbon 200 may be thought of as having side margins 222, 224. The areas within the side margins 222, 224 are considered to be unusable because they may be contacted by edge-guide devices 220 and other objects located on the edges of the channel 218 while the glass ribbon 200 is being produced. Area 230 of the glass ribbon 200 between the side margins 222, 224, i.e., the area between the dashed lines 226, 228, is the usable area. The combined width of the unusable surface areas within the side margins 222, 224 would typically be very small compared to the width of the usable area 230. For example, the combined width of the unusable surface areas within the side margins 222, 224 may not be more than 10% of the total width of the glass ribbon 200, with the width of the usable area 230 being 90% or more of the total width of the glass ribbon 200. In general, it is desirable to maximize the width of the usable area 230 to achieve a high throughput and reduce material waste. To the extent that the usable area 230 remains untouched by a solid (or hard) object, the usable area 230 will be a virgin surface area. A glass sheet derived from the usable area 230 will have virgin glass surfaces.

Figure 3:
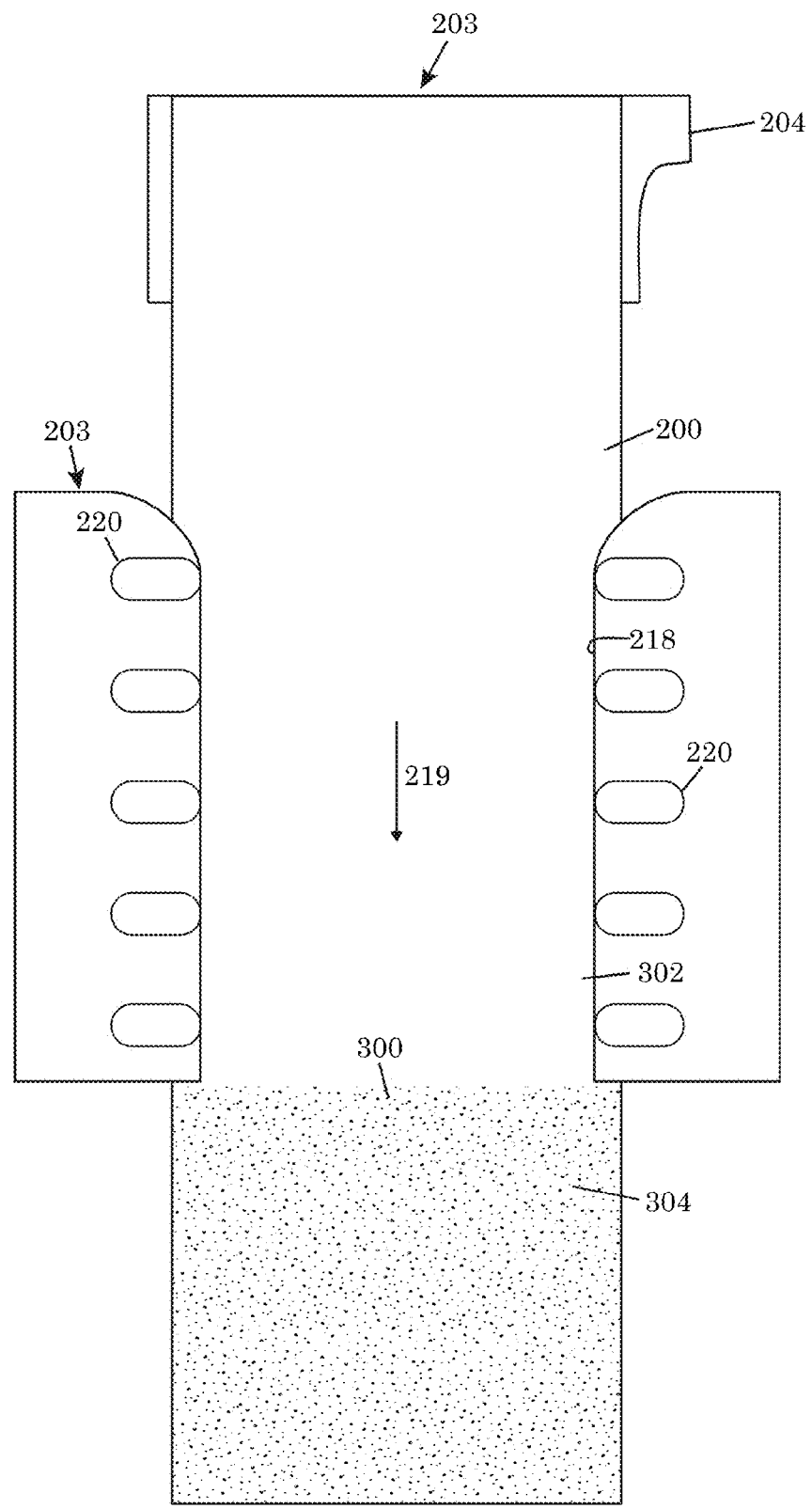
FIG. 3 shows a protective coating applied to a glass ribbon on a fusion draw.

For illustration purposes, FIG. 3 shows a protective coating layer 300 formed on a front surface of the glass ribbon 200 as the glass ribbon 200 is formed from the molten glass. A protective coating layer could also be formed on a back surface of the glass ribbon 200 in a similar manner. Because the glass ribbon 200 is being formed continuously, at any given time, the front surface of the glass ribbon 200 will have a bare region, e.g., region 302, where the protective coating layer 300 has not been formed and a coated region, e.g., region 304, where the protective coating layer 300 has been formed. The protective coating layer 300 will protect the usable area in the coated region 304, allowing the coated region 304 to be handled or processed without the handling or processing resulting in surface flaws in the usable area.

Glass sheets can be separated (or cut) from the coated region 304 of the glass ribbon 200 as the glass ribbon 200 is produced. Because the usable area in the coated region 304 is protected by the protective coating layer 300, the process used in separating the glass sheets from the glass ribbon 200 does not need to be limited to one that would not involve physical contact with the usable area. Separation can be achieved by a mechanical method or a laser method, for example. The glass sheets separated from the coated region 304 of the glass ribbon 200 will have glass surfaces inherited from the pristine usable area of the glass ribbon 200. These pristine glass surfaces are referred to as virgin glass surfaces. Each separated glass sheet will have at least one virgin glass surface covered by a protective coating layer, which comes from the protective coating layer 300 in the coated region 304 of the glass ribbon 200. The protective coating layer will maintain the pristine state of the virgin glass surface it covers.

In an alternate embodiment, a protective coating layer is not formed on the glass ribbon 200 while the glass ribbon 200 is being formed from the molten glass. Instead, glass sheets are separated (or cut) from the glass ribbon 200, preferably using a separation method that does not involve touching the usable area of the glass ribbon 200 with a solid (or hard) object, e.g., laser separation. Then, protective coating layers are formed on the surfaces of the glass sheets to cover the surfaces of the glass sheets. Each glass sheet may have one or two glass surfaces covered by one or two protective coating layers, respectively. Solid (or hard) contact with the surfaces of the glass sheets prior to applying the protective coating layers is preferably avoided so that the surfaces of the glass sheets covered by the protecting coating layers are pristine.

Flat glass articles for making cover glasses as described above can be prepared from the glass sheets having their virgin glass surfaces covered by the protective coating layers. Preparation of a flat glass article may involve separating (or cutting) a piece of glass from the protected glass sheet, contouring an outer edge of the glass piece to match the desired contour of the cover glass, machining any rough edges of the glass piece, and optionally forming features, such as holes or slots or notches, in the glass piece. The finished glass piece would become the flat glass article that will be chemically strengthened by ion-exchange to form the cover glass.

Protective coating materials may be conveniently applied on the surfaces of the glass ribbon 200 near the bottom of the fusion draw system 203, e.g., in or near a region where the glass ribbon 200 would be subjected to handling or processes such as separation. The temperature of the glass ribbon 200 may be in a range from 150° C. to 400° C. in this region. This high temperature may facilitate bonding of the protective coating material to the glass surface. The protective coating material can be applied on the surfaces of the glass ribbon using a variety of methods. U.S. Pat. No. 7,514,149 (Bocko et al; 7 Apr. 2009) discloses exemplary coating methods. One of the coating methods involves delivering a coating material to a fusion-formed glass surface using a trough delivery system. Another coating method involves delivering a coating material to a fusion-formed glass surface using an overflow delivery system. Another coating method involves spraying a coating material on a fusion-formed glass surface.

Figure 4A:
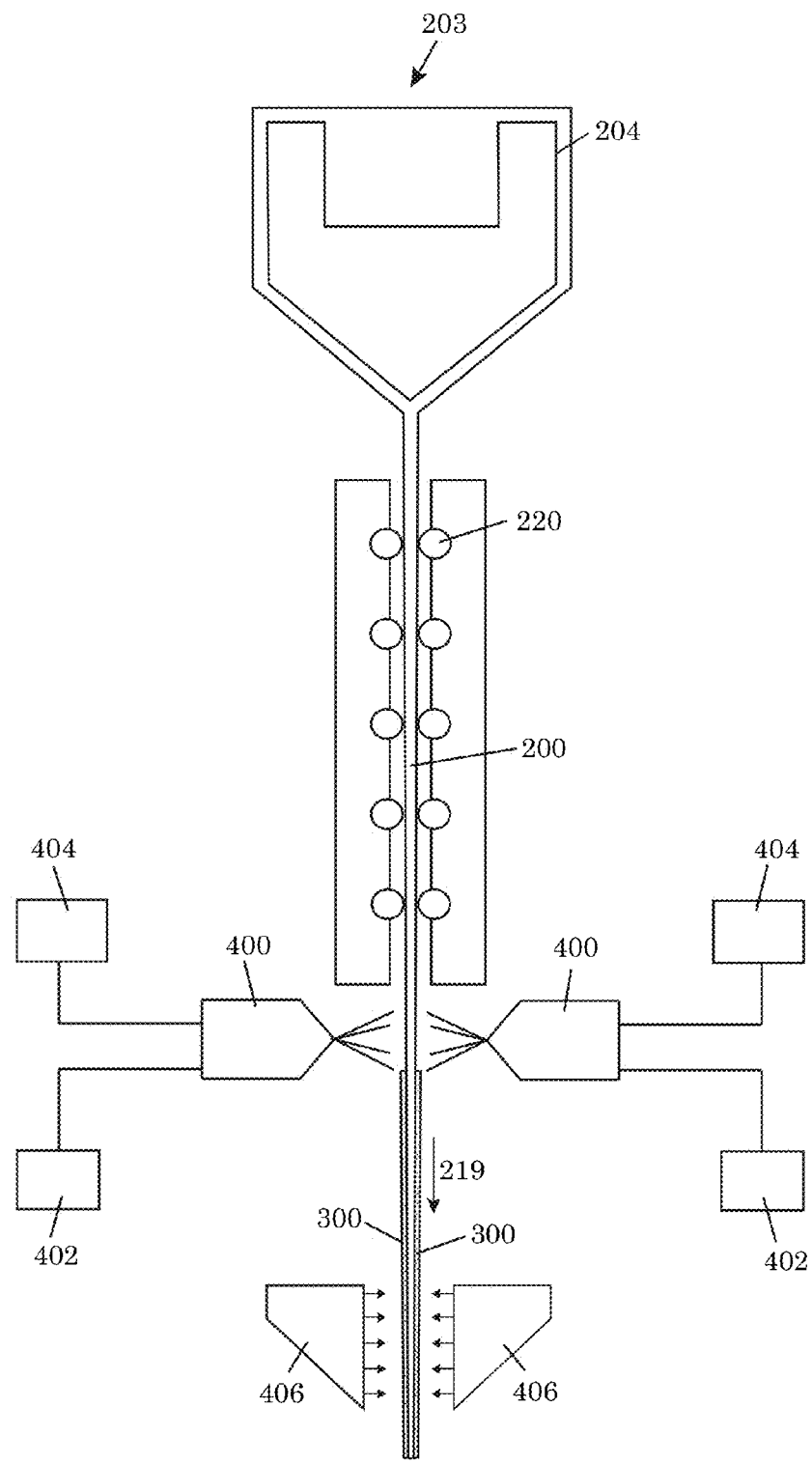
FIG. 4A shows spray-coating of a glass ribbon.

FIG. 4A illustrates a spray coating process for forming the protective coating 300 on surfaces of the glass ribbon 200 near the bottom of the fusion draw system 203. A nozzle 400 is arranged opposite to a surface of the glass ribbon 200. The nozzle 400 is connected to a reservoir 402 containing a spray coating solution, which may be prepared using any of the protective coating materials previously discussed along with any excipients needed for a stable solution. The nozzle 400 may also be connected to a source of pressurized gas 404. The spray coating solution is delivered from the reservoir 402 to the nozzle 400. At the same time that the spray coating solution is delivered to the nozzle 400, the pressurized gas may also be delivered from the pressurized gas source 404 to the nozzle 400. If the spray coating solution and pressurized gas are delivered simultaneously to the nozzle 400, the pressurized gas will atomize the spray coating solution. Thus the nozzle 400 may deliver the protective coating material to the glass surface in a spray coating solution that is or is not atomized.

The nozzle 400 is controlled to spray the protective coating material on a surface of the glass ribbon 200 at a desired deposition rate. The protective coating material sprayed on the glass surface may harden by exposure to the ambient environment or contact with the hot glass surface. Alternatively, depending on the nature of the protective coating material, a curing source 406 may be positioned opposite to the glass surface to provide the energy to cure the protective coating material on the glass surface. The curing source 406 may be a thermal source providing thermal heat or electromagnetic radiation source providing radiation such as ultraviolet radiation.

FIG. 4A shows that nozzles 400 and curing sources 406 may be provided on both sides of the glass ribbon 200 to apply the protective coating material on both surfaces of the glass ribbon 200. The nozzles 400 may be arranged and configured to deposit one or more protective coating materials on the glass ribbon surfaces to form a protective coating having one or more protective coating sublayers.

Figure 4B:
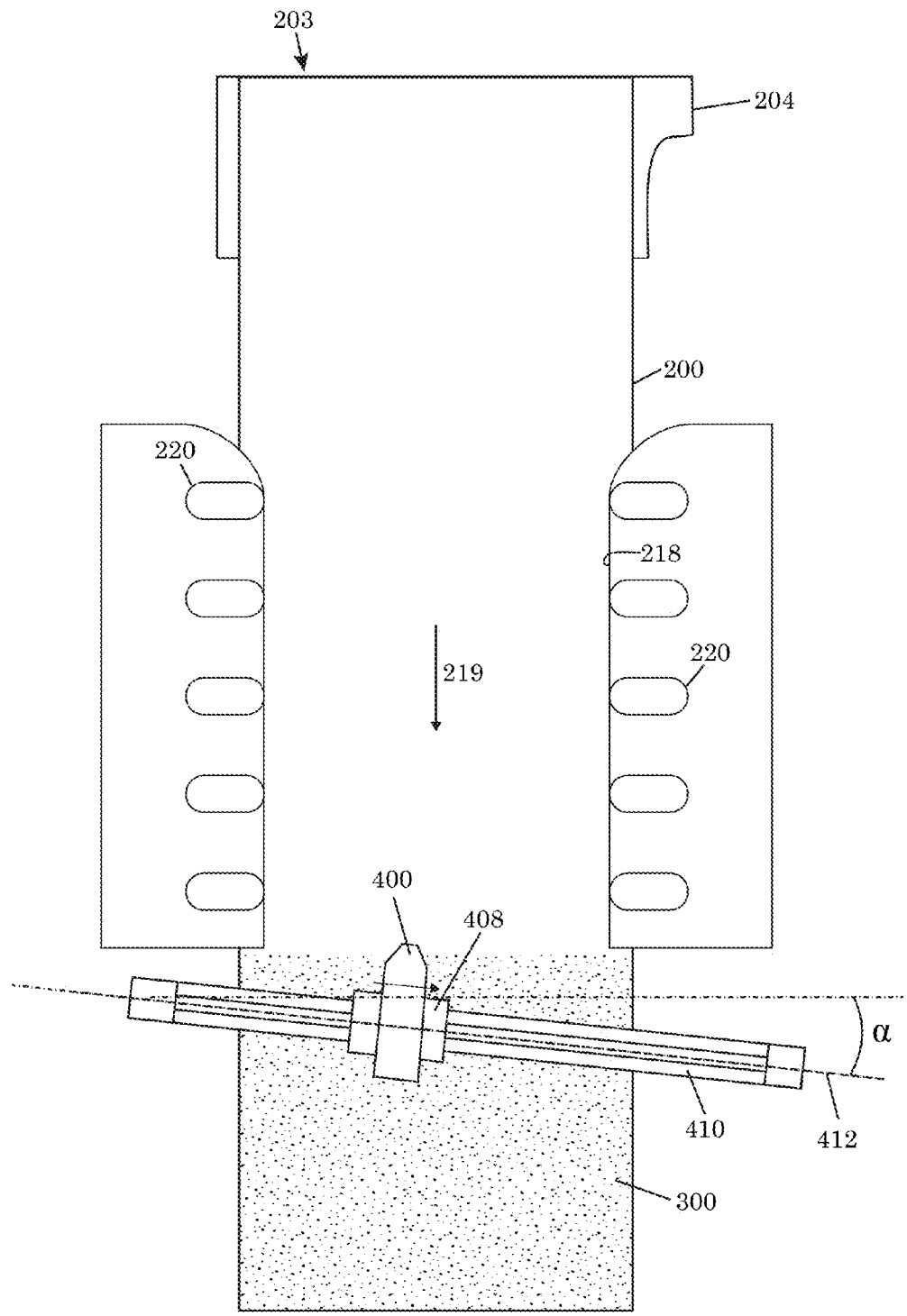
FIG. 4B shows spray-coating of a glass ribbon with a moving spray nozzle.

The nozzle 400 may be translated across a width of the glass surface during the spraying so that the entire width of the glass surface can be covered with the protective coating material. This may involve attaching the nozzle 400 to a robot arm and translating the robot arm across the width of the glass surface. The robot arm would move back and forth across the width of the glass surface during the spraying. Alternatively, as shown in FIG. 4B, the nozzle 400 may be attached to a traveling carriage 408 of a linear slide 410, where the linear slide 410 is positioned opposite to the glass surface and extends across the width of the glass surface. The nozzle 400 can then be translated back and forth across the width of the glass surface via motion of the traveling carriage 408 on the linear slide 410. The translation axis 412 of the nozzle 400 may be inclined relative to the translation direction 219 of the glass surface. The inclination angle α, the speed of the traveling carriage (Vc), and the speed of the glass (Vg) may be selected such that the spray covers a substantially linear area across the width of the glass surface for each pass of the nozzle across the width of the glass surface, i.e., such that sine α=Vg/Vc. There may be some overlap between coated areas on the glass surface such that there are no holes in the final protective coating layer.

In one embodiment, the method includes subjecting the glass sheets having virgin glass surfaces covered by protective coating layers to a strengthening process at a different location or station from where the glass ribbon 200 was formed from molten glass. In this embodiment, immediately before the glass sheets are subjected to the strengthening process, the protective coating layer is removed from the surfaces of the glass sheets. The protective coating layer may be removed by immersing the glass sheets in a mild acidic or basic liquid or gel medium that can preferentially dissolve or etch the protective coating from the glass sheets, such as KOH solution or $KNO_3$ solution, or by exposing the glass sheets to radiation that can preferentially disintegrate the protective coating. Immediately after removing the protective coating layer from the glass sheets, the glass sheets are subjected to an ion-exchange process.

The ion-exchange process takes place in a bath of molten salt containing alkali or alkaline-earth metal ions. The glass sheets are dipped or immersed in the molten salt, and smaller alkali or alkaline-metal ions in the glass sheets are exchanged for the larger alkali or alkaline-earth metal ions in the molten salt. The ion exchange occurs through the surfaces of the glass sheets. After a predetermined immersion or dipping time, the glass sheets are removed from the molten salt and cooled down. The ion-exchanged glass sheets have larger alkali or alkaline-earth metal ions in sites originally occupied by smaller alkali or alkaline-earth metal ions, which creates compressively-stressed regions near the surfaces of the glass sheets and tensile-stressed regions inside the glass sheets. The net effect of the compressively-stressed regions near the surfaces of the glass sheets is that the ion-exchanged glass is toughened compared to its original state. The strength of the glass generally increases as the ion-exchange depth, i.e., the penetration depth of the invading ions into the glass, increases. Typically, the ion-exchange depth is in a range of a few microns to a few tenths of a millimeter and depends on the glass composition and immersion or dipping time.

The base composition of the glass sheets will generally depend on the target use of the glass sheets. Where the glass sheets will be chemically strengthened by ion-exchange as described above, the base composition of the glass sheets should be one that is ion-exchangeable. The term "base composition" means the composition of the glass sheets before ion-exchange. Ion-exchangeable glasses are characterized by the presence of small alkali or alkaline-earth metal ions that can be exchanged for larger alkali or alkaline-earth metal ions. As already explained above, the larger alkali or alkaline-earth metal ions will come from the medium in which the glass sheets are immersed or dipped during the ion-exchange process. Typically, ion-exchangeable glasses are alkali-aluminosilicate glasses or alkali-aluminoborosilicate glasses. Specific examples of ion-exchangeable glasses are disclosed in U.S. Pat. No. 7,666,511 (Ellison et al; 20 Nov. 2008), U.S. Pat. No. 4,483,700 (Forker, Jr. et al.; 20 Nov. 1984), and U.S. Pat. No. 5,674,790 (Araujo; 7 Oct. 1997); U.S. patent application Ser. No. 12/277,573 (Dejneka et al.; 25 Nov. 2008), Ser. No. 12/392,577 (Gomez et al.; 25 Feb. 2009), Ser. No. 12/856,840 (Dejneka et al.; 10 Aug. 2010), Ser. No. 12/858,490 (Barefoot et al.; 18 Aug. 18, 2010), and Ser. No. 13/305,271 (Bookbinder et al.; 28 Nov. 2010); and U.S. Provisional Patent Application No. 61/503,734 (Dejneka et al.; 1 Jul. 2011).

In one embodiment, the same medium that is used to remove the protective coating from the glass sheets is used to chemically strengthen the glass sheets by ion exchange. That is, the coating removal and ion-exchange processes take place in the same bath. The glass sheets are immersed or dipped in the medium in the bath under conditions that would facilitate removal of the protective coating from the glass sheets. Then, the conditions are adjusted to facilitate ion-exchange. For example, the temperature of the bath can be adjusted to a range that would facilitate ion exchange between the medium and the glass sheets, or the concentration of the medium may be adjusted. Performing the coating removal and ion exchange processes in the same bath may have the effect of avoiding physical (solid or hard) contact with the glass sheets between the period in which removal of the protective coating ends and strengthening of the glass sheets begins. For this embodiment, the medium may be a salt containing relatively large alkali or alkaline-earth metal ions that can be exchanged for relatively small alkali or alkaline-earth metal ions in the glass sheets. Typically, the medium will be used in liquid or molten form.

Example 1

Figure 5:
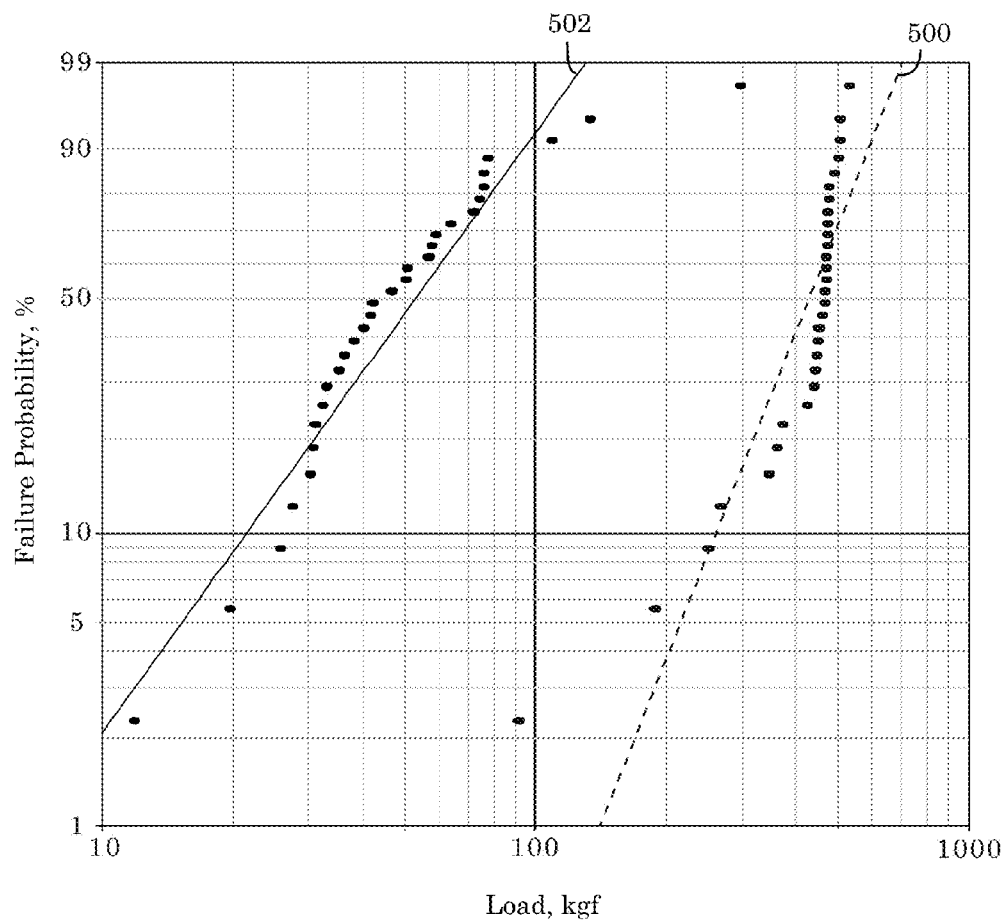
FIG. 5 shows failure probability versus load for coated and uncoated glass samples.

The strengths of several glass samples were assessed using a ring-on-ring (RoR) test. For the first set of glass samples, a protective coating layer was applied on each virgin glass surface of the glass samples. The second set of glass samples did not have any surface protective coating layer. The RoR test included placing each of the glass samples between a loading ring and a reaction ring and applying a linearly increasing load to the glass sample through the loading ring. The load was applied until the glass sample failed. FIG. 5 is a graph showing probability of failure versus load for the glass samples assessed. Each of the data points represents a glass sample. Line 500 represents a best fit through the data points corresponding to the first set of glass samples with protective coating. Line 502 represents a best fit through the data points corresponding to the second set of glass samples without protective coating. The graph shows that the first set of glass samples with the protective coating can be subjected to much higher loads before failure than the second set of glass samples without the protective coating.

Example 2

Figure 6:
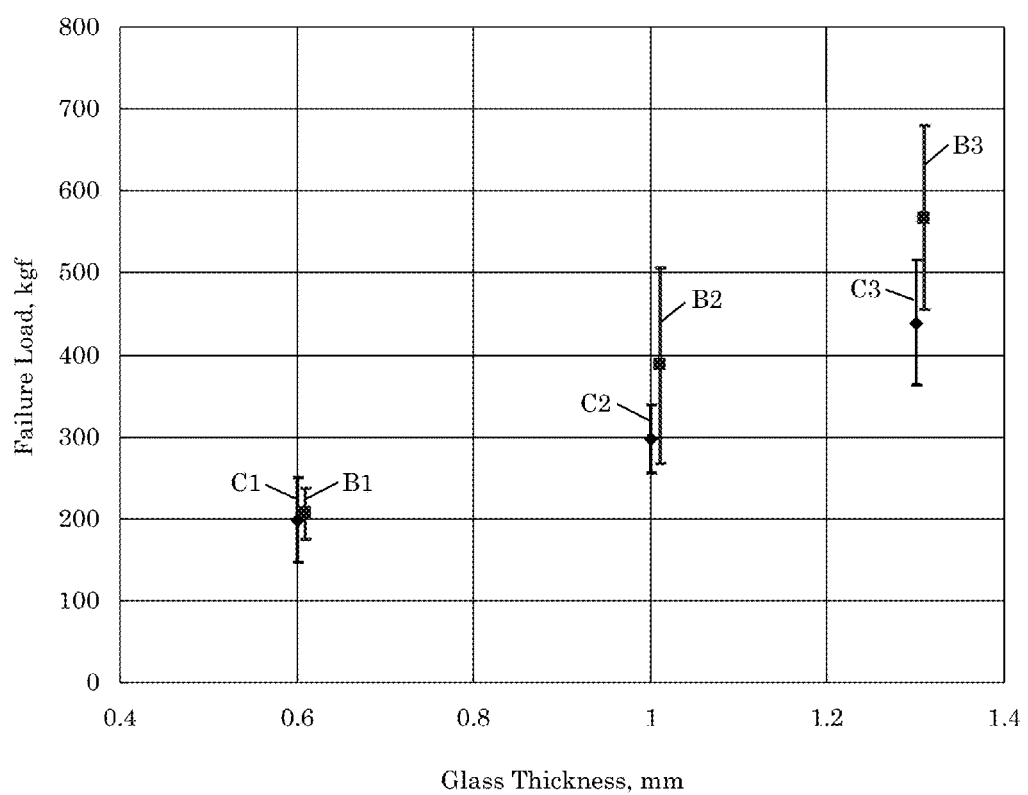
FIG. 6 shows failure load versus glass thickness for coated and uncoated glass samples.

The strengths of glass samples subjected to ion-exchange processes under similar conditions were assessed using a RoR test. Six glass samples, B1, B2, B3, C1, C2, C3, were evaluated. Each of the glass samples B1, C1 had a thickness of 0.6 mm. Each of the glass samples B2, C2 had a thickness of 1.0 mm. Each of the glass samples B3, C3 had a thickness of 1.3 mm. A protective coating layer was applied on each of the virgin glass surfaces of the glass samples B1, B2, B3, C1 and removed just before subjecting the glass samples to the ion-exchange process. Each of the glass samples C2, C3 was not coated with any protective coating layer. Instead, the glass samples C2, C3 were wrapped in paper for protection between when they were made and when they were subjected to the ion-exchange process. The glass samples were shipped and handled prior to being subjected to the ion-exchange process. Glass samples B1, B2, and B3 were made of a first glass composition, and glass samples C1, C2, and C3 were made of a second glass composition that is different from the first glass composition. The exact nature of the glass compositions is not important to evaluating the results of the RoR test. FIG. 6 shows the failure load of each glass sample assessed. FIG. 6 shows that the protective coating layer provided an additional degree of surface protection.

While the invention has been described with respect to a limited number of embodiments, those skilled in the art, having benefit of this disclosure, will appreciate that other embodiments can be devised which do not depart from the scope of the invention as disclosed herein.

The invention claimed is:

1. A method of making a strengthened glass article, comprising:
   providing a flat glass article having a select contour and a glass surface covered by a protective coating layer, wherein providing the flat glass article comprises:
   forming a glass ribbon from molten glass;
   forming the protective coating layer on a surface area of the glass ribbon before touching the surface area of the glass ribbon with any solid object, wherein forming the protective coating layer comprises depositing a protective coating material on the surface area of the glass ribbon while the surface area of the glass ribbon has a temperature in a range from 150° C. to 400° C.; and
   preparing the flat glass article from a section of the glass ribbon covered by the protective coating layer;
   removing the protective coating layer from the glass surface without touching the glass surface with any solid object; and
   after removing the protective coating layer from the glass surface, subjecting the flat glass article to an ion-exchange process to strengthen the flat glass article and improve the resistance of the flat glass article to subsequent damage.

2. The method of claim 1, wherein the glass surface covered by the protective coating layer is a virgin glass surface that has not been touched by any solid object.

3. The method of claim 2, wherein the protective coating layer comprises at least two protective coating sublayers with different hardnesses, and wherein the protective coating sublayer having the smallest hardness is closest to the glass surface.

4. The method of claim 3, wherein forming the protective coating layer comprises:
   depositing at least two protective coating materials on the surface area of the glass ribbon, each of the at least two protective coating materials corresponding to one of the at least two protective coating sublayers; and
   curing the at least two protective coating materials deposited on the surface area of the glass ribbon to form the at least two protective coating sublayers with the different hardnesses.

5. The method of claim 3, wherein forming of protective coating layer comprises:
   depositing a single protective coating material on the surface area of the glass ribbon; and
   differentially curing the single protective coating material deposited on the surface area of the glass ribbon to form the at least two protective coating sublayers with the different hardnesses.

6. The method of claim 2, wherein the protective coating layer comprises a polymer coating material.

7. The method of claim 2, wherein the protective coating layer comprises an acrylic coating material.

8. The method of claim 2, wherein preparing the flat glass article from the section of the glass ribbon comprises separating the section of the glass ribbon from the glass ribbon.

9. The method of claim 8, wherein preparing the flat glass article from the section of the glass ribbon further comprises at least one of separating a glass piece from the section, shaping the glass piece into the flat glass article having the select contour, machining any rough edges of the flat glass article, and forming features selected from the group consisting of holes, slots, and notches in the flat glass article.

10. The method of claim 2, wherein removing the protective coating layer comprises:
    immersing or dipping the flat glass article in a liquid medium in a bath, the liquid medium being capable of removing the protective coating layer from the glass surface of the flat glass article without damaging the glass surface.

11. The method of claim 10, wherein subjecting the flat glass article to the ion-exchange process comprises:
    leaving the flat glass article immersed or dipped in the liquid medium in the bath; and
    adjusting a condition of the bath to facilitate exchange of ions between the liquid medium and the flat glass article.

12. The method of claim 1, wherein a same medium that is used to remove the protective coating layer from the glass surface is used to strengthen the glass sheets by ion-exchange such that the glass surface of the flat glass article is not contacted by any solid object between the steps of removing the protective coating layer from the glass surface and subjecting the flat glass article to an ion-exchange process.

13. The method of claim 12, wherein the conditions of the medium are changed between the removal of the protective coating layer and the ion-exchange process.

14. A method of making a strengthened glass article, comprising:
  supplying molten glass to a weir such that the molten glass overflows the weir to form a glass ribbon;
  drawing the glass ribbon through a thermally-graded channel;
  while drawing the glass ribbon through the thermally-graded channel, depositing at least one protective coating material on a surface area of the glass ribbon to form a protective coating layer on the surface area of the glass ribbon, wherein the at least one protective coating material is deposited on the surface area of the glass ribbon while the surface area has a temperature in a range from 150° C. to 400° C.;
  separating a glass sheet from a section of the glass ribbon covered by the protective coating layer;
  preparing a flat glass article having a select contour and a glass surface covered by the protective coating layer from the glass sheet;
  removing the protective coating layer from the glass surface without touching the glass surface with any solid object; and
  after removing the protective coating layer from the glass surface, subjecting the flat glass article to an ion-exchange process to strengthen the flat glass article and improve the resistance of the flat glass article to subsequent damage.

15. The method of claim 14, wherein the at least one protective coating material is a polymer coating material, and further comprising curing the polymer coating material prior to separating the glass sheet from the glass ribbon.

16. The method of claim 14, wherein the at least one protective coating material is deposited on the surface area of the glass ribbon by spraying.

17. The method of claim 14, wherein the protective coating layer comprises at least two protective coating sublayers with different hardnesses, and wherein the protective coating sublayer having the smallest hardness is closest to the glass surface.

18. The method of claim 14, wherein a same medium that is used to remove the protective coating layer from the glass surface is used to strengthen the glass sheets by ion-exchange such that the glass surface of the flat glass article is not contacted by any solid object between the steps of removing the protective coating layer from the glass surface and subjecting the flat glass article to an ion-exchange process.

19. The method of claim 18, wherein the conditions of the medium are changed between the removal of the protective coating layer and the ion-exchange process.

* * * * *